US012204975B2

United States Patent
Nishida

(10) Patent No.: US 12,204,975 B2
(45) Date of Patent: Jan. 21, 2025

(54) NONCONTACT COMMUNICATION MEDIUM, MAGNETIC TAPE CARTRIDGE, MAGNETIC TAPE DRIVE, AND NONCONTACT COMMUNICATION SYSTEM

(71) Applicant: FUJIFILM CORPORATION, Tokyo (JP)

(72) Inventor: Kenji Nishida, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/589,319

(22) Filed: Feb. 27, 2024

(65) Prior Publication Data

US 2024/0303459 A1 Sep. 12, 2024

(30) Foreign Application Priority Data

Mar. 9, 2023 (JP) ................................. 2023-036996

(51) Int. Cl.
*G06K 19/077* (2006.01)
*G11B 7/24097* (2013.01)

(52) U.S. Cl.
CPC .... *G06K 19/07758* (2013.01); *G11B 7/24097* (2013.01)

(58) Field of Classification Search
CPC ............ G06K 19/07758; G11B 7/24097
See application file for complete search history.

(56) References Cited

U.S. PATENT DOCUMENTS

| 2013/0119774 A1* | 5/2013 | Ichikawa | B60L 53/122 |
| | | | 307/104 |
| 2016/0344237 A1* | 11/2016 | Cho | H02J 50/80 |
| 2017/0174088 A1* | 6/2017 | Muramatsu | B60L 53/12 |
| 2021/0241061 A1* | 8/2021 | Kataoka | G06K 19/0723 |
| 2021/0242906 A1* | 8/2021 | Kataoka | H04B 5/79 |

FOREIGN PATENT DOCUMENTS

| JP | 2006-323918 A | 11/2006 |
| JP | 4466678 B2 | 5/2010 |
| JP | 2011-097389 A | 5/2011 |

* cited by examiner

*Primary Examiner* — Tuyen K Vo
(74) *Attorney, Agent, or Firm* — SOLARIS Intellectual Property Group, PLLC

(57) ABSTRACT

A noncontact communication medium includes a resonance circuit configured to resonate using an induced current induced by the antenna coil to generate an alternating current voltage, and a control circuit. The resonance circuit includes a variable condenser connected in parallel to the antenna coil, and a variable resistor connected in parallel to the antenna coil. The control circuit adjusts capacitance of the variable condenser to cause the resonance circuit to resonate at a predetermined resonance frequency, and adjusts a resistance value of the variable resistor to adjust a Q value. The noncontact communication medium operates using power based on a direct current voltage obtained by rectifying the alternating current voltage. And the communication is communication using a signal corresponding to a waveform of the alternating current voltage.

12 Claims, 11 Drawing Sheets

NONCONTACT COMMUNICATION MEDIUM, MAGNETIC TAPE CARTRIDGE, MAGNETIC TAPE DRIVE, AND NONCONTACT COMMUNICATION SYSTEM

CROSS-REFERENCE TO RELATED APPLICATIONS

This application claims priority under 35 USC 119 from Japanese Patent Application No. 2023-036996, filed on Mar. 9, 2023, the disclosure of which is incorporated by reference herein.

BACKGROUND

1. Technical Field

A technology of the present disclosure relates to a noncontact communication medium, a magnetic tape cartridge, a magnetic tape drive, and a noncontact communication system.

2. Related Art

JP2006-323918A discloses a technology of recording related information of data recorded on a magnetic tape comprised in a magnetic recording tape cartridge, on a noncontact memory IC tag comprised in the magnetic recording tape cartridge.

JP4466678B discloses an RFID tag in which an adjustment condenser and a resonance condenser are connected in parallel and that is included in a resonance circuit.

JP2011-097389A discloses a technology of controlling a Q value in order to avoid deterioration of an S/N ratio of a communication signal due to influence from external noise.

SUMMARY

One embodiment according to the technology of the present disclosure provides a noncontact communication medium, a magnetic tape cartridge, a magnetic tape drive, and a noncontact communication system which are capable of achieving both stabilization of power for operating the noncontact communication medium and suppression of distortion of a waveform of an alternating current voltage.

A first aspect according to the technology of the present disclosure is a noncontact communication medium that performs communication, via a magnetic field provided from an external device, with the external device in a noncontact manner, the noncontact communication medium comprising a resonance circuit configured to resonate using an induced current induced, with application of the magnetic field to an antenna coil, by the antenna coil to generate an alternating current voltage, and a control circuit, in which the resonance circuit includes a variable condenser connected in parallel to the antenna coil, and a variable resistor connected in parallel to the antenna coil, the control circuit adjusts capacitance of the variable condenser to cause the resonance circuit to resonate at a predetermined resonance frequency, and adjusts a resistance value of the variable resistor to adjust a Q value, the noncontact communication medium operates using power based on a direct current voltage obtained by rectifying the alternating current voltage, and the communication is communication using a signal corresponding to a waveform of the alternating current voltage.

A second aspect according to the technology of the present disclosure is the noncontact communication medium according to the first aspect, in which the control circuit adjusts the capacitance in accordance with a comparison result between a voltage value of the alternating current voltage and a voltage value of the direct current voltage to cause the resonance circuit to resonate at the predetermined resonance frequency, and adjusts the resistance value in accordance with the comparison result to adjust the Q value.

A third aspect according to the technology of the present disclosure is the noncontact communication medium according to the first or second aspect, in which, in a case where a voltage value of the alternating current voltage is larger than a voltage value of the direct current voltage, the control circuit increases the resistance value to reduce the Q value.

A fourth aspect according to the technology of the present disclosure is the noncontact communication medium according to any one of the first to third aspects, in which, in a case where a voltage value of the alternating current voltage is larger than a voltage value of the direct current voltage, the control circuit adjusts the capacitance to maximize the direct current voltage.

A fifth aspect according to the technology of the present disclosure is the noncontact communication medium according to any one of the first to fourth aspects, further comprising a rectifier circuit configured to rectify the alternating current voltage to generate the direct current voltage, a regulator configured to generate the power based on the direct current voltage, and a processing circuit configured to operate by supply of the power.

A sixth aspect according to the technology of the present disclosure is the noncontact communication medium according to any one of the first to fifth aspects, further comprising a processing circuit configured to operate by supply of the power, in which the signal includes a command signal transmitted from the external device, and the processing circuit executes processing in response to the command signal.

A seventh aspect according to the technology of the present disclosure is the noncontact communication medium according to the sixth aspect, further comprising a memory, in which the processing includes write-in processing of writing first information determined in response to the command signal into the memory, and/or read-out processing of reading out second information determined in response to the command signal from the memory.

An eighth aspect according to the technology of the present disclosure is the noncontact communication medium according to any one of the first to sixth aspects, in which the predetermined resonance frequency is a resonance frequency at which the direct current voltage is maximized.

A ninth aspect according to the technology of the present disclosure is the noncontact communication medium according to any one of the first to eighth aspects, in which the noncontact communication medium is mounted on a magnetic tape cartridge.

A tenth aspect according to the technology of the present disclosure is a magnetic tape cartridge comprising the noncontact communication medium according to any one of the first to ninth aspects, and a magnetic tape, in which the noncontact communication medium includes a memory, and the memory stores information on the magnetic tape.

An eleventh aspect according to the technology of the present disclosure is a magnetic tape drive comprising a magnetic tape cartridge including the noncontact communication medium according to any one of the first to ninth aspects, and a magnetic tape, and a magnetic head into which the magnetic tape cartridge is loaded and that performs recording processing and/or playing processing with respect to the magnetic tape.

A twelfth aspect according to the technology of the present disclosure is a noncontact communication system comprising the noncontact communication medium according to any one of the first to ninth aspects, and a communication device configured to perform communication with the noncontact communication medium in a noncontact manner.

BRIEF DESCRIPTION OF THE DRAWINGS

Exemplary embodiments of the technology of the disclosure will be described in detail based on the following figures, wherein.

DETAILED DESCRIPTION

Hereinafter, an example of an embodiment of a noncontact communication medium, a magnetic tape cartridge, a magnetic tape drive, and a noncontact communication system according to a technology of the present disclosure will be described referring to the accompanying drawings.

First, the wording used in the following description will be described.

CPU refers to an abbreviation of a "central processing unit". RAM refers to an abbreviation of a "random access memory". DRAM refers to an abbreviation of a "dynamic random access memory". NVM refers to an abbreviation of a "non-volatile memory". EEPROM refers to an abbreviation of an "electrically erasable and programmable read only memory". SSD refers to an abbreviation of a "solid state drive". HDD refers to an abbreviation of a "hard disk drive". ASIC refers to an abbreviation of an "application specific integrated circuit". PLD refers to an abbreviation of a "programmable logic device". FPGA refers to an abbreviation of a "field-programmable gate array". SoC refers to an abbreviation of a "system-on-chip". IC refers to an abbreviation of an "integrated circuit". RFID refers to an abbreviation of a "radio frequency identifier". UI refers to an abbreviation of a "user interface".

Figure 1:
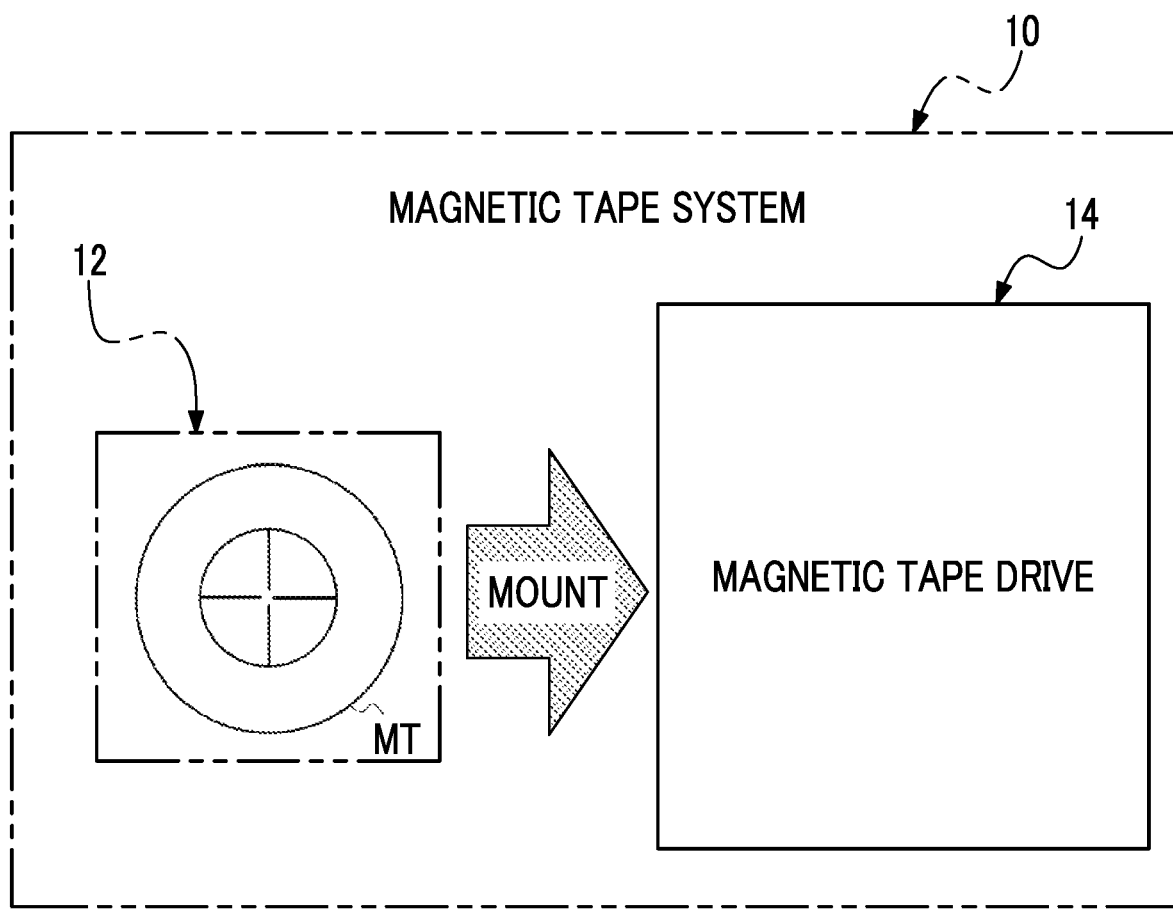
FIG. 1 is a conceptual diagram showing an example of a configuration of a magnetic tape system.

As an example, as shown in FIG. 1, a magnetic tape system 10 comprises a magnetic tape cartridge 12 and a magnetic tape drive 14. The magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and, while causing the pulled out magnetic tape MT to travel, records data in the magnetic tape MT and reads data from the magnetic tape MT.

In addition, in the present embodiment, the magnetic tape drive 14 is an example of the "magnetic tape drive" and the "noncontact communication system" according to the technology of the present disclosure. In addition, in the present embodiment, the magnetic tape MT is an example of a "magnetic tape" according to the technology of the present disclosure. In addition, in the present embodiment, the magnetic tape cartridge 12 is an example of the "magnetic tape cartridge" according to the technology of the present disclosure.

Next, an example of a configuration of the magnetic tape cartridge 12 will be described with reference to FIGS. 2 to 4. In the following description, for convenience of description, in FIGS. 2 to 4, a loading direction of the magnetic tape cartridge 12 into the magnetic tape drive 14 is indicated by an arrow A, an arrow A direction is defined as a front direction of the magnetic tape cartridge 12, and a side of the magnetic tape cartridge 12 in the front direction is defined as a front side of the magnetic tape cartridge 12. In the following description of a structure, "front" refers to the front side of the magnetic tape cartridge 12.

In addition, in the following description, for convenience of description, in FIGS. 2 to 4, an arrow B direction orthogonal to the arrow A direction is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the arrow B direction is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the arrow A direction and the arrow B direction is indicated by an arrow C, an arrow C direction is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
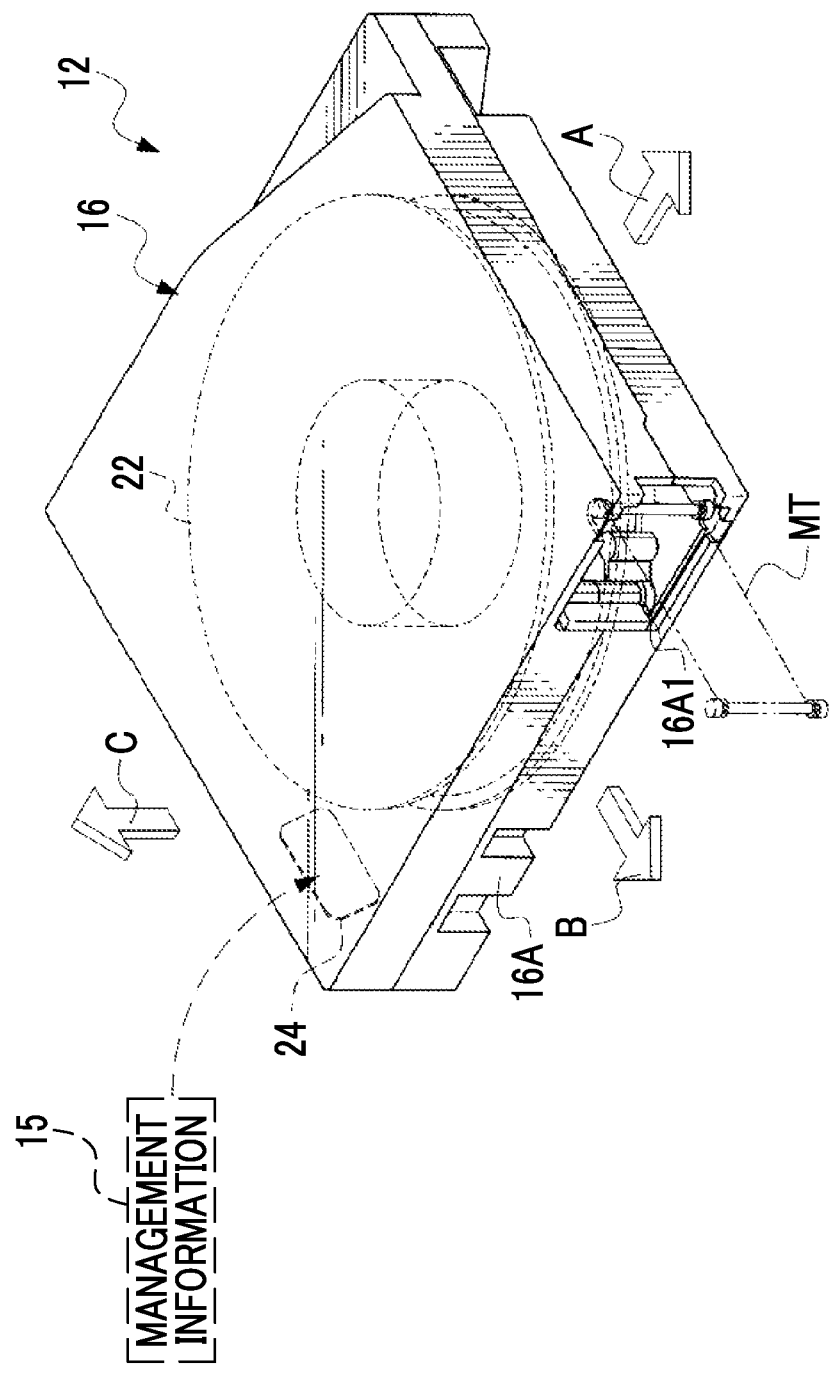
FIG. 2 is a schematic perspective view showing an example of an appearance of a magnetic tape cartridge.

As an example, as shown in FIG. 2, the magnetic tape cartridge 12 has a substantially rectangular shape in a plan view, and comprises a box-shaped case 16. The magnetic tape MT is accommodated in the case 16.

A sending reel 22 is rotatably accommodated inside the case 16. The magnetic tape MT is wound around the sending reel 22. An opening 16A1 is formed on a front side of a right wall 16A of the case 16. The magnetic tape MT is pulled out from the opening 16A1.

A cartridge memory 24 is accommodated in the case 16 as a storage medium other than the magnetic tape MT. An IC chip having an NVM is mounted on the cartridge memory 24. In the present embodiment, a so-called passive type RFID tag is adopted as the cartridge memory 24, and read/write of various pieces of information (that is, acquisition and storage of various pieces of information) is performed with respect to the cartridge memory 24 in a noncontact manner.

The cartridge memory 24 stores management information 15 for managing the magnetic tape cartridge 12. The management information 15 includes, for example, information on the cartridge memory 24, information on the magnetic tape MT, information on the magnetic tape drive 14, and the like. In the present embodiment, the cartridge memory 24 is an example of the "noncontact communication medium" according to the technology of the present disclosure. In addition, in the present embodiment, the management information 15 is an example of "first information", "second information", and "information on the magnetic tape" according to the technology of the present disclosure.

Figure 3:
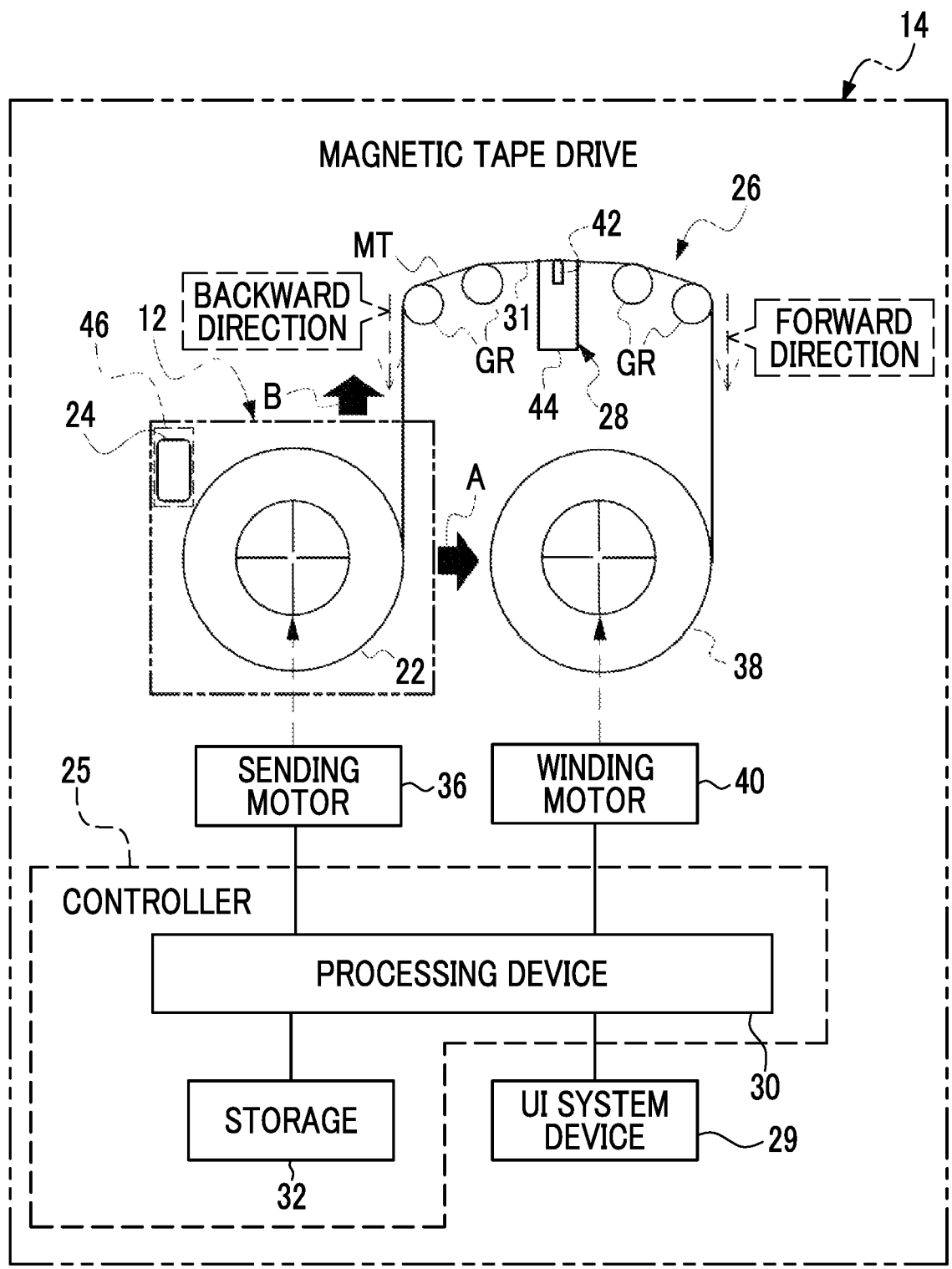
FIG. 3 is a schematic configuration diagram showing an example of a hardware configuration of a magnetic tape drive.

As an example, as shown in FIG. 3, the magnetic tape drive 14 comprises a controller 25, a transport device 26, a magnetic head 28, and a UI system device 29. The controller 25 comprises a processing device 30 and a storage 32.

The magnetic tape cartridge 12 is loaded into the magnetic tape drive 14 along the arrow A direction. In the magnetic tape drive 14, the magnetic tape MT is pulled out from the magnetic tape cartridge 12 and used. The magnetic tape drive 14 controls each unit of the magnetic tape cartridge 12 and the magnetic tape drive 14 by using the management information 15 or the like stored in the cartridge memory 24.

The magnetic tape drive 14 performs magnetic processing on a surface 31 of the magnetic tape MT by using the magnetic head 28 in a state where the magnetic tape MT is made to travel. The surface 31 is a recording surface on which data is recorded. The magnetic processing refers to recording processing in which the magnetic head 28 records data on the surface 31 of the magnetic tape MT and a playing processing in which the magnetic head 28 plays data from the surface 31 of the magnetic tape MT. The magnetic tape drive 14 selectively performs the recording processing and the playing processing by using the magnetic head 28. That is, the magnetic tape drive 14 pulls out the magnetic tape MT from the magnetic tape cartridge 12, and records data in the surface 31 of the pulled out magnetic tape MT by using the magnetic head 28 or plays data from the surface 31 of the pulled out magnetic tape MT by using the magnetic head 28.

The processing device 30 controls the entire magnetic tape drive 14. In the present embodiment, although the processing device 30 is realized by an ASIC, the technology of the present disclosure is not limited thereto. For example, the processing device 30 may be realized by an FPGA and/or a PLD. In addition, the processing device 30 may be realized by a computer including a CPU, a flash memory (for example, an EEPROM, an SSD, and/or the like), and a RAM. In addition, the processing device 30 may be realized by combining two or more of an ASIC, an FPGA, a PLD, and a computer. That is, the processing device 30 may be realized by a combination of a hardware configuration and a software configuration.

The storage 32 is connected to the processing device 30, and the processing device 30 writes various pieces of information into the storage 32 and reads out various pieces of information from the storage 32. An example of the storage 32 is a flash memory and/or an HDD. A flash memory and an HDD are merely an example, and any memory may be used as long as the memory is a non-volatile memory that can be mounted on the magnetic tape drive 14.

The UI system device 29 is a device having a reception function of receiving an instruction signal indicating an instruction from a user and a presentation function of presenting information to the user. The reception function is realized by a touch panel, a hard key (for example, a keyboard), a mouse, and/or the like, for example. The presentation function is realized by a display, a printer, a speaker, and/or the like, for example. The UI system device 29 is connected to the processing device 30. The processing device 30 acquires the instruction signal received by the UI system device 29. The UI system device 29 presents various pieces of information to the user under control of the processing device 30.

The transport device 26 is a device that selectively transports the magnetic tape MT along a predetermined path in a forward direction and a backward direction, and comprises a sending motor 36, a winding reel 38, a winding motor 40, and a plurality of guide rollers GR. Here, the forward direction refers to a sending direction of the magnetic tape MT, and the backward direction refers to a rewinding direction of the magnetic tape MT.

The sending motor 36 rotates the sending reel 22 in the magnetic tape cartridge 12 under control of the processing device 30. The processing device 30 controls the sending motor 36 to control a rotation direction, a rotation speed, a rotation torque, and the like of the sending reel 22.

The winding motor 40 rotates the winding reel 38 under control of the processing device 30. The processing device 30 controls the winding motor 40 to control a rotation direction, a rotation speed, a rotation torque, and the like of the winding reel 38.

In a case where the magnetic tape MT is wound by the winding reel 38, the processing device 30 rotates the sending motor 36 and the winding motor 40 such that the magnetic tape MT travels along the predetermined path in the forward direction. The rotation speeds, the rotation torques, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the processing device 30, tension is applied to the magnetic tape MT. In addition, the tension applied to the magnetic tape MT is controlled by adjusting the rotation speed, the rotation torque, and the like of each of the sending motor 36 and the winding motor 40 by the processing device 30.

In a case where the magnetic tape MT is rewound around the sending reel 22, the processing device 30 rotates the sending motor 36 and the winding motor 40 such that the magnetic tape MT travels along the predetermined path in the backward direction.

Each of the plurality of guide rollers GR is a roller that guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the traveling magnetic tape MT. The magnetic element unit 42 has a plurality of magnetic elements.

The magnetic element unit 42 records data in the magnetic tape MT transported by the transport device 26, or plays data from the magnetic tape MT transported by the transport device 26.

The magnetic tape drive 14 comprises a reader/writer 46. The reader/writer 46 is disposed so as to confront a back surface of the cartridge memory 24 on the lower side of the magnetic tape cartridge 12 in a state where the magnetic tape cartridge 12 is loaded, and performs communication (for example, reading and writing of information with respect to the cartridge memory 24) with the cartridge memory 24 in a noncontact manner. In the present embodiment, the reader/writer 46 is an example of an "external device" and a "communication device" according to the technology of the present disclosure.

Figure 4:
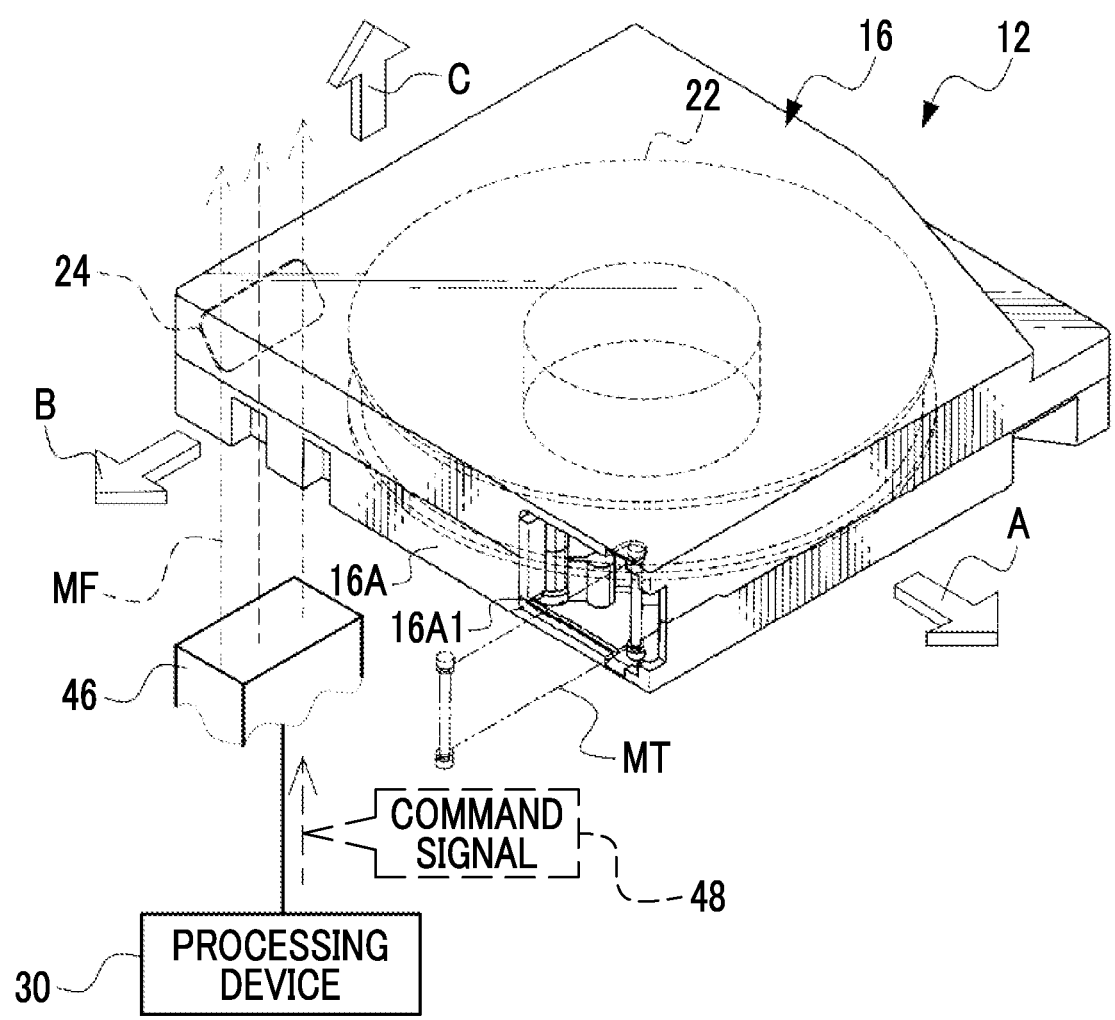
FIG. 4 is a schematic perspective view showing an example of an aspect in which a magnetic field is released by a reader/writer from a lower side of the magnetic tape cartridge.

As an example, as shown in FIG. 4, the reader/writer 46 is connected to the processing device 30. The processing device 30 outputs a command signal 48 to the reader/writer 46. The command signal 48 is a signal indicating a command to the cartridge memory 24. The reader/writer 46 generates a magnetic field MF in response to the command signal 48 input from the processing device 30, and releases the magnetic field MF from the lower side of the magnetic tape cartridge 12 toward the cartridge memory 24. The magnetic field MF released from the reader/writer 46 passes through the cartridge memory 24. In the present embodiment, the magnetic field MF is an example of a "magnetic field" according to the technology of the present disclosure.

The reader/writer 46 spatially transmits the command signal 48 to the cartridge memory 24 under control of the processing device 30. In a case where the command signal 48 is spatially transmitted from the reader/writer 46 to the cartridge memory 24, a command signal 48 is included in the magnetic field MF by the reader/writer 46 in accordance with an instruction from the processing device 30. In other words, the command signal 48 is superimposed on the magnetic field MF. That is, the reader/writer 46 transmits the command signal 48 to the cartridge memory 24 via the magnetic field MF under control of the processing device 30.

The reader/writer 46 performs communication with the cartridge memory 24 via the magnetic field MF in a noncontact manner to cause the cartridge memory 24 to perform processing in response to the command signal 48. For example, the reader/writer 46 transmits the command signal 48 to the cartridge memory 24 to cause the cartridge memory 24 to perform processing including write-in processing, read-out processing, and/or the like. The write-in processing refers to, for example, processing of writing information determined in response to the command signal 48 out of the management information 15 (refer to FIG. 2) into a storage region in the cartridge memory 24. The read-out processing refers to, for example, processing of reading out information, which is determined in response to the command signal 48 out of the management information 15 stored in the storage region in the cartridge memory 24, from the storage region.

The processing device 30 performs communication with the cartridge memory 24 via the reader/writer 46 in a noncontact manner to write the management information 15 into the cartridge memory 24 or read out the management information 15 from the cartridge memory 24.

Figure 5:
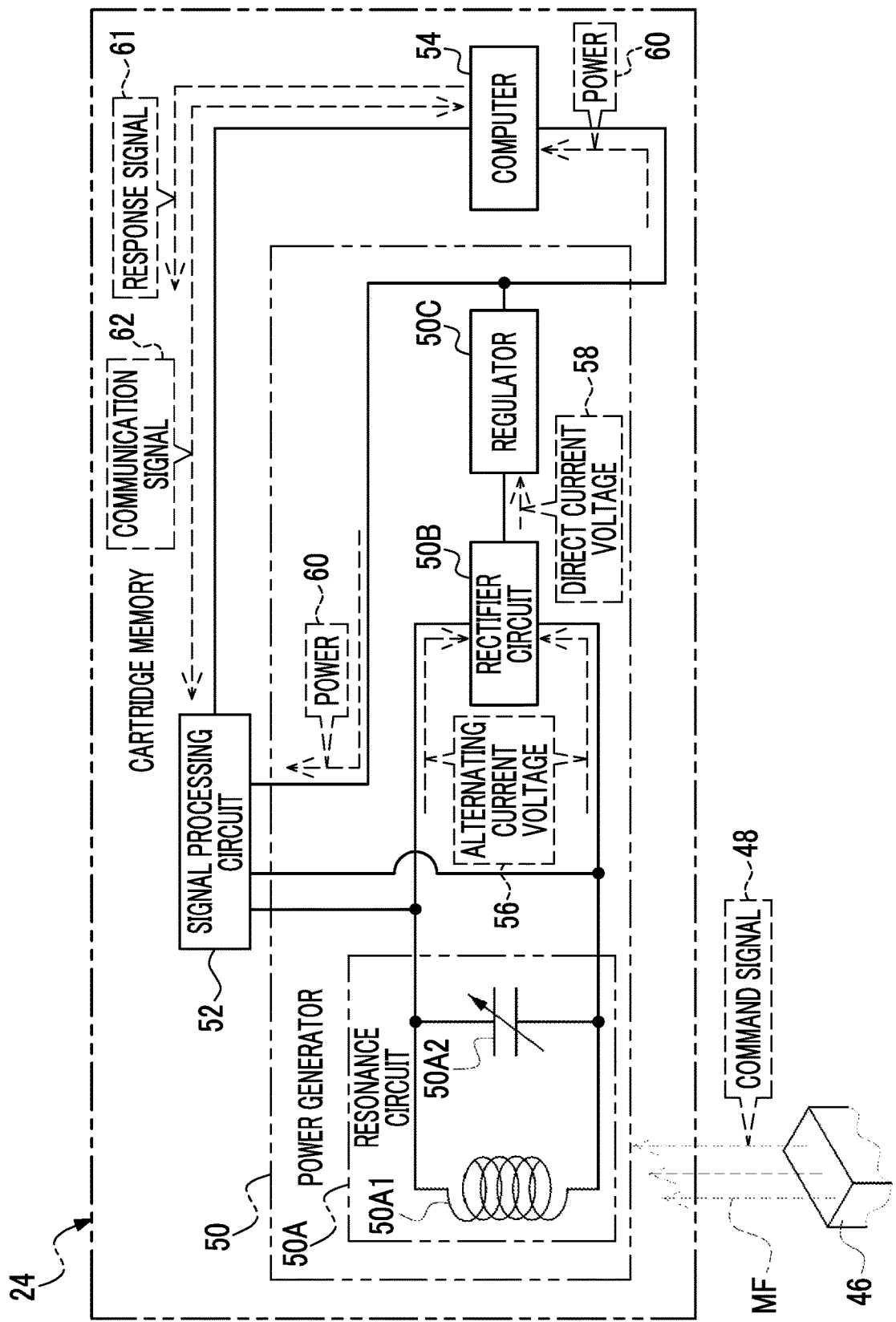
FIG. 5 is a conceptual diagram showing an example of a hardware configuration of an electric system of a cartridge memory mounted on the magnetic tape cartridge.

As an example, as shown in FIG. 5, the cartridge memory 24 comprises a power generator 50, a signal processing circuit 52, and a computer 54. The power generator 50 has a resonance circuit 50A, a rectifier circuit 50B, and a regulator 50C. The resonance circuit 50A includes an antenna coil 50A1 and a variable condenser 50A2. The variable condenser 50A2 is connected in parallel to the antenna coil 50A1. In the example shown in FIG. 5, the single variable condenser 50A2 is connected in parallel to the antenna coil 50A1. In addition, the antenna coil 50A1 and the variable condenser 50A2 are connected in parallel to the signal processing circuit 52, and are also connected in parallel to the rectifier circuit 50B.

In the present embodiment, the resonance circuit 50A is an example of a "resonance circuit" according to the technology of the present disclosure. In addition, in the present embodiment, the antenna coil 50A1 is an example of an "antenna coil" according to the technology of the present disclosure. In addition, in the present embodiment, the variable condenser 50A2 is an example of a "variable condenser" according to the technology of the present disclosure.

The power generator 50 generates power 60 with application of the magnetic field MF provided from the reader/writer 46 (refer to FIGS. 3 and 4) to the antenna coil 50A1. The power 60 is power for operating the cartridge memory 24.

In order to realize the generation of the power 60, the resonance circuit 50A resonates using an induced current induced by the antenna coil 50A1 with the application of the magnetic field MF to the antenna coil 50A1 (that is, causes a resonance phenomenon to occur) to generate an alternating current voltage 56. The resonance circuit 50A outputs the alternating current voltage 56 to the rectifier circuit 50B.

The rectifier circuit 50B rectifies the alternating current voltage 56 input from the resonance circuit 50A to generate a direct current voltage 58. The rectifier circuit 50B is connected to the regulator 50C, and outputs the direct current voltage 58 to the regulator 50C.

The regulator 50C is connected to various circuits (in the example shown in FIG. 5, the signal processing circuit 52, the computer 54, and the like) included in the cartridge memory 24. The regulator 50C generates the power 60 based on the direct current voltage 58 input from the rectifier circuit 50B (for example, direct current power obtained by constant voltage conversion of the direct current voltage 58 to a predetermined voltage value) and supplies the power 60 to the various circuits included in the cartridge memory 24 to operate the various circuits included in the cartridge memory 24.

The signal processing circuit 52 is connected to the resonance circuit 50A. The signal processing circuit 52 has a decoding circuit (not shown) and an encoding circuit (not shown). The decoding circuit of the signal processing circuit 52 extracts and decodes the command signal 48 from the magnetic field MF received by the antenna coil 50A1 and outputs the command signal 48 to the computer 54. The computer 54 outputs a response signal 61 to the command signal 48 to the signal processing circuit 52. That is, the computer 54 executes processing in response to the command signal 48 input from the signal processing circuit 52 and outputs the response signal 61 showing a processing result to the signal processing circuit 52. In the signal processing circuit 52, in a case where the response signal 61 is input from the computer 54, the encoding circuit of the signal processing circuit 52 modulates the response signal 61 by encoding and outputs the response signal 61 to the resonance circuit 50A. The resonance circuit 50A transmits the response signal 61 input from the encoding circuit of the signal processing circuit 52 to the reader/writer 46 via the magnetic field MF. That is, in a case where the response signal 61 is transmitted from the cartridge memory 24 to the reader/writer 46, the response signal 61 is included in the magnetic field MF. In other words, the response signal 61 is superimposed on the magnetic field MF.

The signal processing circuit 52 transmits and receives a communication signal 62 to and from the computer 54. In the present embodiment, the concept of the communication signal 62 includes a signal obtained by decoding the command signal 48 by the signal processing circuit 52 and the response signal 61. In the present embodiment, the command signal 48 is an example of a "command signal" according to the technology of the present disclosure.

Figure 6:
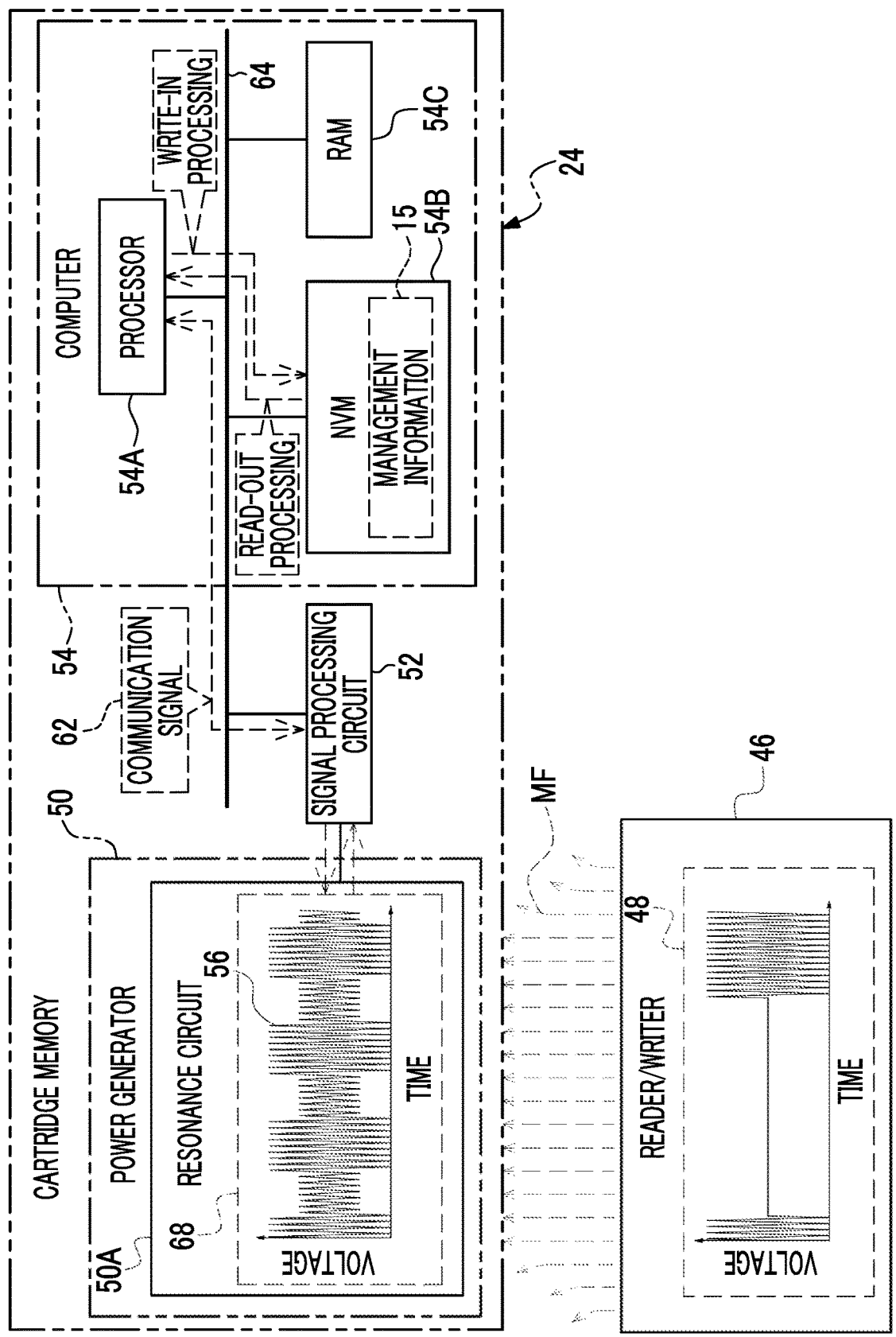
FIG. 6 is a conceptual diagram showing a configuration example of various circuits included in the cartridge memory and a waveform example of a signal having a waveform without distortion.

The computer 54 controls the entire cartridge memory 24. As an example, as shown in FIG. 6, the computer 54 comprises a processor 54A, an NVM 54B, and a RAM 54C. The processor 54A is, for example, a CPU. The NVM 54B is, for example, a non-volatile memory such as an EEPROM and/or a ferroelectric memory. The RAM 54C is a volatile memory such as a DRAM. The processor 54A, the NVM 54B, and the RAM 54C are connected to a bus 64. In addition, the signal processing circuit 52 is connected to the bus 64, and the communication signal 62 is transmitted and received between the processor 54A and the signal processing circuit 52. In the present embodiment, the processor 54A is an example of a "processing circuit" according to the technology of the present disclosure. In addition, in the present embodiment, the NVM 54B is an example of a "memory" according to the technology of the present disclosure.

The processor 54A selectively executes the write-in processing and the read-out processing, as processing in response to the command signal 48, with respect to the NVM 54B. That is, the information determined in response to the command signal 48 is written into the NVM 54B by performing the write-in processing by the processor 54A, and the information determined in response to the command signal 48 out of information stored in the NVM 54B is read out from the NVM 54B by performing the read-out processing by the processor 54A. In the example shown in FIG. 6, an aspect example in which the management information 15 is stored in the NVM 54B is shown, and the processor 54A writes the management information 15 into the NVM 54B or reads out the management information 15 from the NVM 54B, in response to the command signal 48.

The command signal 48 is a waveform signal, and is transmitted to the cartridge memory 24 by the reader/writer 46 via the magnetic field MF. The resonance circuit 50A resonates in a case of receiving the command signal 48 transmitted from the reader/writer 46, and generates a signal 68 corresponding to a waveform of the alternating current voltage 56. The signal 68 generated by the resonance circuit 50A is decoded by the signal processing circuit 52 and output to the processor 54A as the communication signal 62. The processor 54A executes processing in response to the communication signal 62 input from the signal processing circuit 52. Further, the processor 54A outputs the processing result as the communication signal 62 (that is, the response signal 61 (refer to FIG. 5)) to the signal processing circuit 52. The signal processing circuit 52 encodes the communication signal 62 input from the processor 54A, and the resonance circuit 50A transmits the signal 68 of a waveform corresponding to a signal obtained by encoding the communication signal 62 by the signal processing circuit 52 to the reader/writer 46 via the magnetic field MF. In this way, noncontact communication performed between the cartridge memory 24 and the reader/writer 46 is realized by using the signal 68. In the present embodiment, the signal 68 is an example of a "signal" according to the technology of the present disclosure.

By the way, in order to stabilize the noncontact communication between the cartridge memory 24 and the reader/writer 46, it is preferable that a waveform of the signal 68 is a waveform without distortion conforming to a communication method (for example, a method conforming to a known standard such as ISO14443 or ISO18092, or a method conforming to the LTO specification of ECMA319). In a case where the waveform of the signal 68 is a waveform without distortion, the processor 54A can accurately specify the content of the command signal 48, and the reader/writer 46 can accurately specify the content of the response signal 61.

Figure 7:
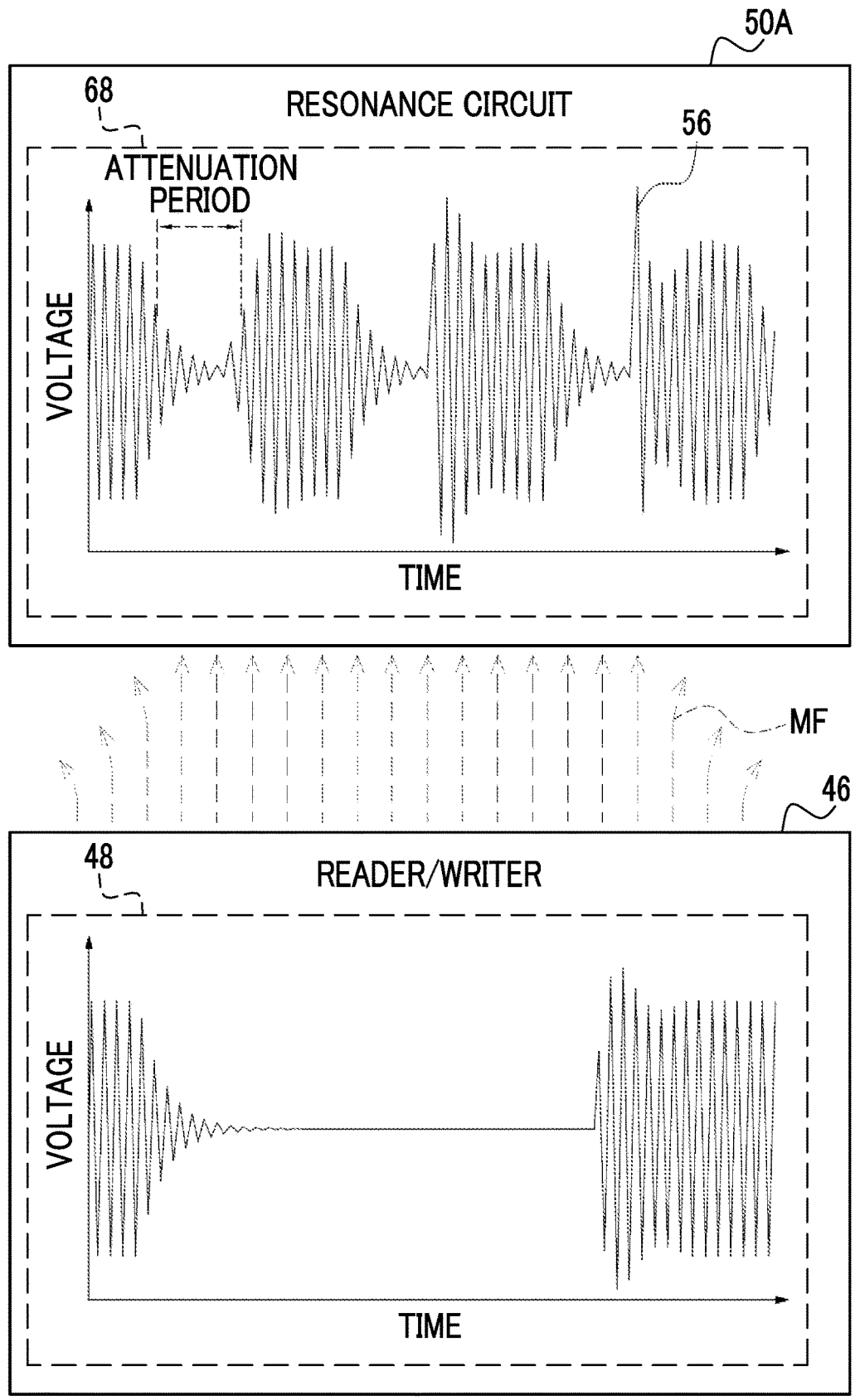
FIG. 7 is a conceptual diagram showing a waveform example of a signal having a waveform with distortion.

However, as an example, as shown in FIG. 7, in a case where a signal-to-noise ratio of the command signal 48 deteriorates because of influence of external noise or the like, a waveform of the command signal 48 is distorted, and correspondingly, the waveform of the signal 68 overshoots or undershoots, so that the waveform of the signal 68 is distorted. Then, it is difficult to accurately transmit the content of the command signal 48 to the processor 54A. In addition, even in a case where the external noise or the like directly affects the signal 68, the waveform of the signal 68 is distorted, so that communication failure occurs between the cartridge memory 24 and the reader/writer 46. That is, it is difficult to accurately transmit the content of the command signal 48 to the processor 54A or accurately transmit the content of the response signal 61 to the reader/writer 46.

On the other hand, as shown in FIG. 7, in a case where a period in which the waveform of the signal 68 is significantly attenuated occurs, it is difficult to stably supply power to the cartridge memory 24. As a method of increasing the supply power, there is a method of setting a quality factor (Q value) of the single antenna coil 50A1 to be high. The Q value refers to an indicator showing sharpness of a signal at a resonance frequency. In a case of setting the Q value of the single antenna coil 50A1 to be high, intensity of the magnetic field MF received by the antenna coil 50A1 can be increased (that is, the supply of the magnetic field MF can be increased), so that large power can be supplied. However, since the distortion of the waveform of the signal 68 occurs, communication failure occurs between the cartridge memory 24 and the reader/writer 46.

Therefore, at present, it is desired to achieve both elimination of the distortion of the waveform of the signal 68 and the stable power supply to the cartridge memory 24.

Figure 8:
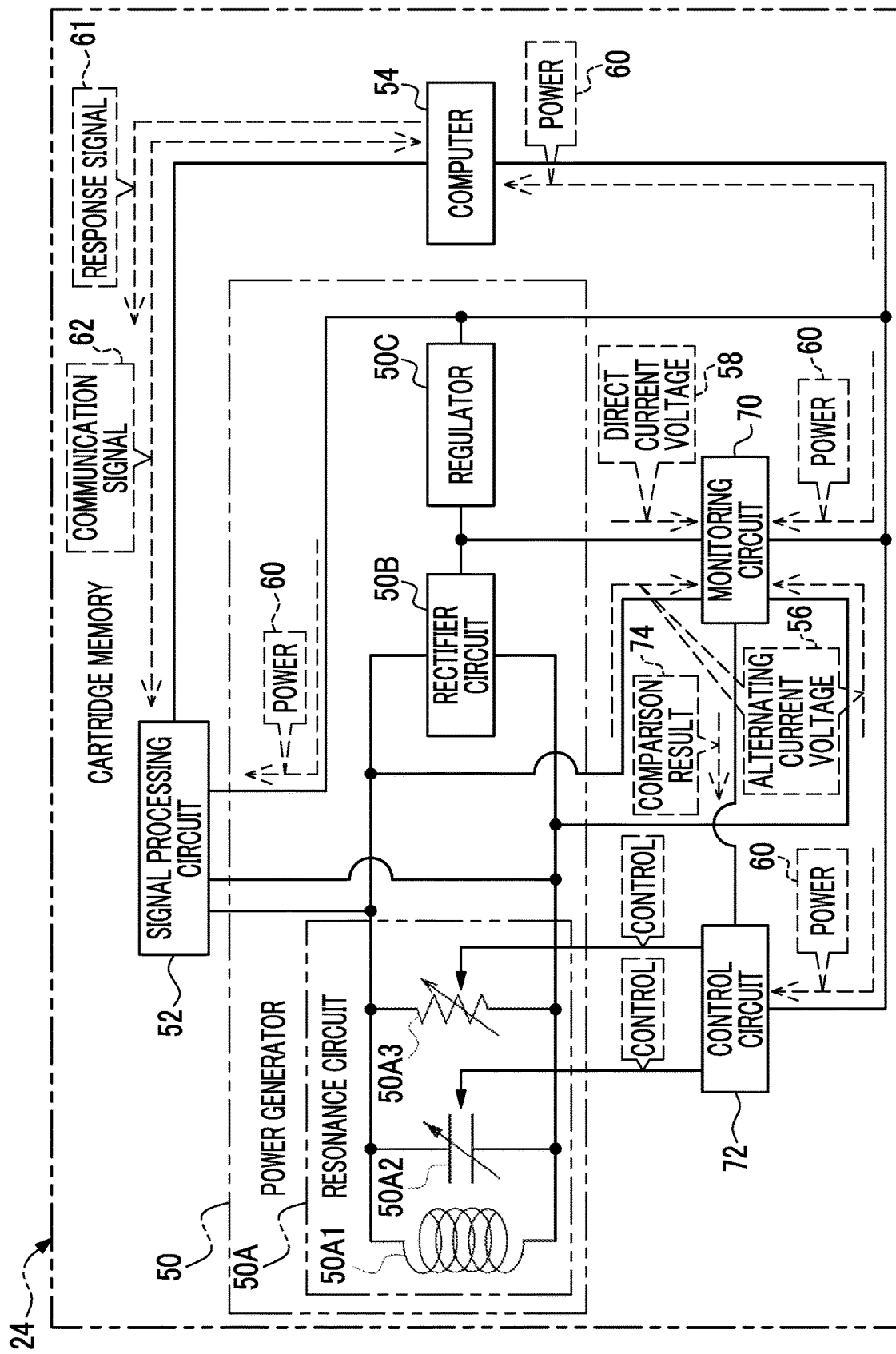
FIG. 8 is a conceptual diagram showing an example of a detailed hardware configuration of the electric system of the cartridge memory shown in FIG. 5.

Therefore, in view of such circumstances, in the present embodiment, as an example, as shown in FIG. 8, the cartridge memory 24 comprises a variable resistor 50A3, a monitoring circuit 70, and a control circuit 72. The variable resistor 50A3 is incorporated in the resonance circuit 50A and is connected in parallel to the antenna coil 50A1. In the present embodiment, the variable resistor 50A3 is an example of a "variable resistor" according to the technology of the present disclosure. In addition, in the present embodiment, the control circuit 72 is an example of a "control circuit" according to the technology of the present disclosure.

An output end of the regulator 50C is connected to the monitoring circuit 70 and the control circuit 72, and the monitoring circuit 70 and the control circuit 72 operate using the power 60 supplied from the regulator 50C.

An output end of the rectifier circuit 50B is connected to the monitoring circuit 70, and the direct current voltage 58 is input from the rectifier circuit 50B. In addition, the resonance circuit 50A is connected to the monitoring circuit 70, and the alternating current voltage 56 is input from the resonance circuit 50A.

The monitoring circuit 70 monitors the alternating current voltage 56 (that is, the waveform itself of the alternating current voltage 56) generated by the resonance circuit 50A and the direct current voltage 58 output from the rectifier circuit 50B. For example, the monitoring circuit 70 compares a voltage value of the alternating current voltage 56 and a voltage value of the direct current voltage 58 (for example, an instantaneous voltage value or a statistic value (such as an average value, a median value, a most frequent value, or a maximum value) in a given period of a voltage value of the direct current voltage 58) to outputs a comparison result 74 (for example, a signal indicating a magnitude relationship between the voltage value of the alternating current voltage 56 and the voltage value of the direct current voltage 58) to the control circuit 72.

The control circuit 72 adjusts capacitance of the variable condenser 50A2 to cause the resonance circuit 50A to resonate at a predetermined resonance frequency, and adjusts a resistance value of the variable resistor 50A3 to adjust the Q value. The predetermined resonance frequency refers to, for example, a resonance frequency at which the direct current voltage 58 is maximized. An example of the resonance frequency at which the direct current voltage 58 is maximized is a frequency corresponding to a frequency of the magnetic field MF (for example, 13.56 MHz).

The comparison result 74 is input to the control circuit 72 from the monitoring circuit 70. The control circuit 72 adjusts the capacitance of the variable condenser 50A2 based on the comparison result 74 input from the monitoring circuit 70 and adjusts the resistance value of the variable resistor 50A3 based on the comparison result 74 input from the monitoring circuit 70 to adjust the Q value.

More specifically, the control circuit 72 increases the resistance value of the variable resistor 50A3 to reduce the Q value in a case where the voltage value of the alternating current voltage 56 is larger than the voltage value of the direct current voltage 58, referring to the comparison result 74. In addition, the control circuit 72 adjusts the capacitance of the variable condenser 50A2 to maximize the direct current voltage 58 in a case where the voltage value of the alternating current voltage 56 is larger than the voltage value of the direct current voltage 58, referring to the comparison result 74. For example, in a case where the control circuit 72 increases the capacitance of the variable condenser 50A2, the voltage value of the direct current voltage 58 shortly reaches the maximum value, and in a case where the control circuit 72 further increases the capacitance of the variable condenser 50A2, the voltage value of the direct current voltage 58 decreases from the maximum value. In this way, the control circuit 72 changes the capacitance of the variable condenser 50A2 to find out the maximum value of the voltage value of the direct current voltage 58.

Next, actions of parts of the magnetic tape system 10 according to the technology of the present disclosure will be described with reference to FIGS. 9 and 10.

Figure 9:
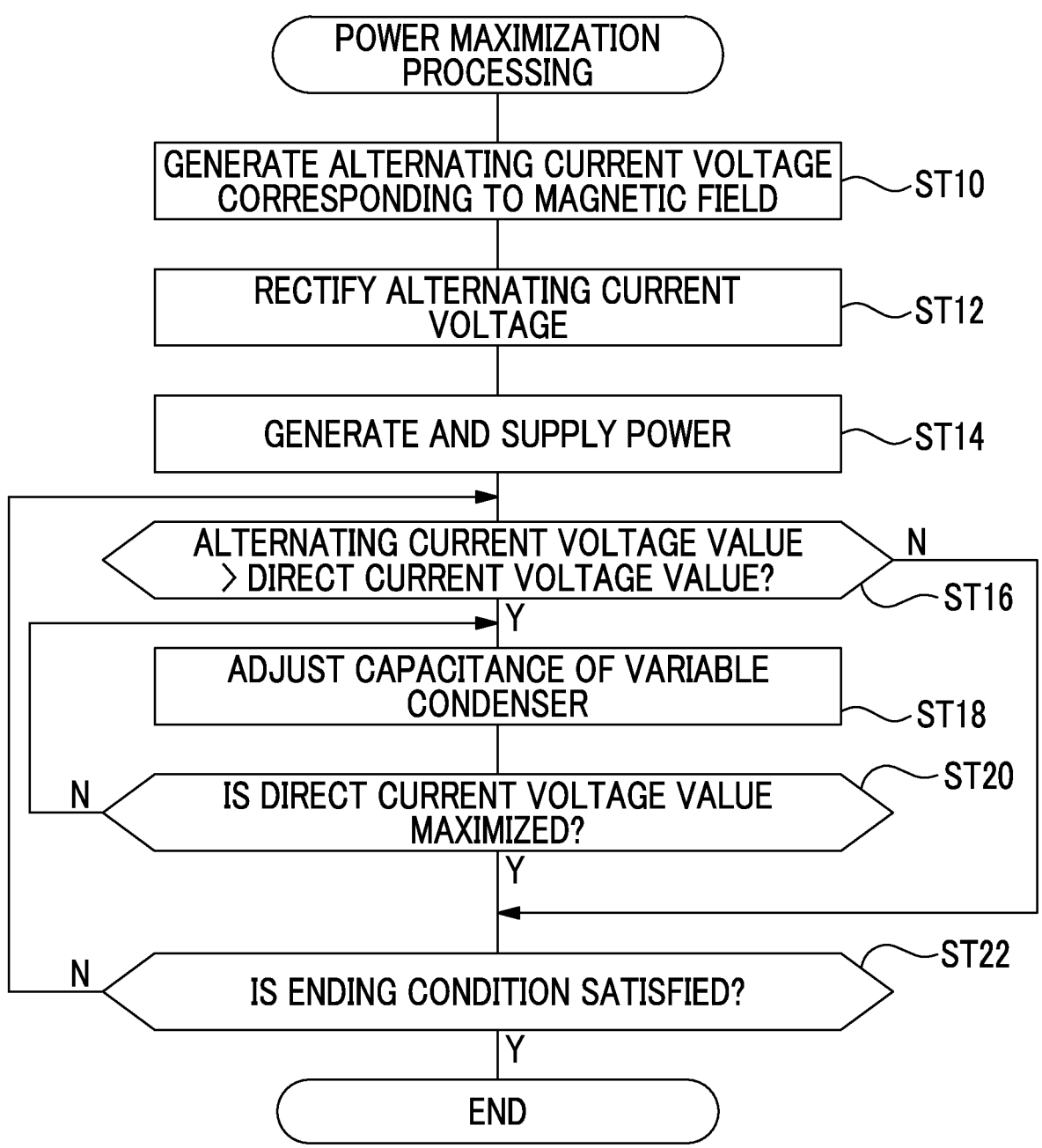
FIG. 9 is a flowchart showing an example of a flow of power maximization processing.

FIG. 9 shows a flowchart showing an example of a flow of power maximization processing performed by the cartridge memory 24 in a case where the resonance circuit 50A resonates with the application of the magnetic field MF released from the reader/writer 46 to the antenna coil 50A1 of the cartridge memory 24. FIG. 10 shows a flowchart showing an example of a flow of distortion suppression processing performed by the cartridge memory 24 in a case where the resonance circuit 50A resonates with the application of the magnetic field MF released from the reader/writer 46 to the antenna coil 50A1 of the cartridge memory 24.

First, the power maximization processing will be described with reference to FIG. 9.

In the power maximization processing shown in FIG. 9, first, in step ST10, the resonance circuit 50A starts the generation of the alternating current voltage 56 corresponding to the magnetic field MF. After the processing of step ST10 is executed, the power maximization processing shifts to step ST12.

In step ST12, the rectifier circuit 50B rectifies the alternating current voltage 56 generated in step ST10 to start the generation of the direct current voltage 58. After the processing of step ST12 is executed, the power maximization processing shifts to step ST14.

In step ST14, the regulator 50C performs constant voltage conversion of the direct current voltage 58 generated in step ST12 to start the generation of the power 60. Moreover, the regulator 50C starts the supply of the power 60 to the various circuits included in the cartridge memory 24. After the processing of step ST14 is executed, the power maximization processing shifts to step ST16.

In step ST16, the monitoring circuit 70 determines whether or not the voltage value of the alternating current voltage 56 is larger than the voltage value of the direct current voltage 58. In step ST16, in a case where the voltage value of the alternating current voltage 56 is larger than the voltage value of the direct current voltage 58, determination is made to be affirmative, and the power maximization processing shifts to step ST18. In step ST16, in a case where the voltage value of the alternating current voltage 56 is equal to or less than the voltage value of the direct current voltage 58, determination is made to be negative, and the power maximization processing shifts to step ST22.

In step ST18, the control circuit 72 adjusts the capacitance of the variable condenser 50A2 with reference to the comparison result 74 (refer to FIG. 8). After the processing of step ST18 is executed, the power maximization processing shifts to step ST20.

In step ST20, the monitoring circuit 70 determines whether or not the voltage value of the direct current voltage 58 is maximized. In step ST20, in a case where the voltage value of the direct current voltage 58 is maximized, determination is made to be affirmative, and the power maximization processing shifts to step ST22. In step ST20, in a case where the voltage value of the direct current voltage 58 is not maximized, determination is made to be negative, and the power maximization processing shifts to step ST16.

In step ST22, the monitoring circuit 70 determines whether or not a condition under which the power maximization processing ends is satisfied. An example of the condition under which the power maximization processing ends is a condition that a time during which the voltage value of the alternating current voltage 56 or the voltage value of the direct current voltage 58 is "zero" continues for a certain period of time or longer, or a condition that a command for causing the power maximization processing to end is given from the reader/writer 46 as the command signal 48.

In step ST22, in a case where the condition under which the power maximization processing ends is not satisfied, determination is made to be negative, and the power maximization processing shifts to step ST16. In step ST22, in a case where the condition under which the power maximization processing ends is satisfied, determination is made to be affirmative, and the power maximization processing ends.

Next, the distortion suppression processing will be described with reference to FIG. 10.

Figure 10:
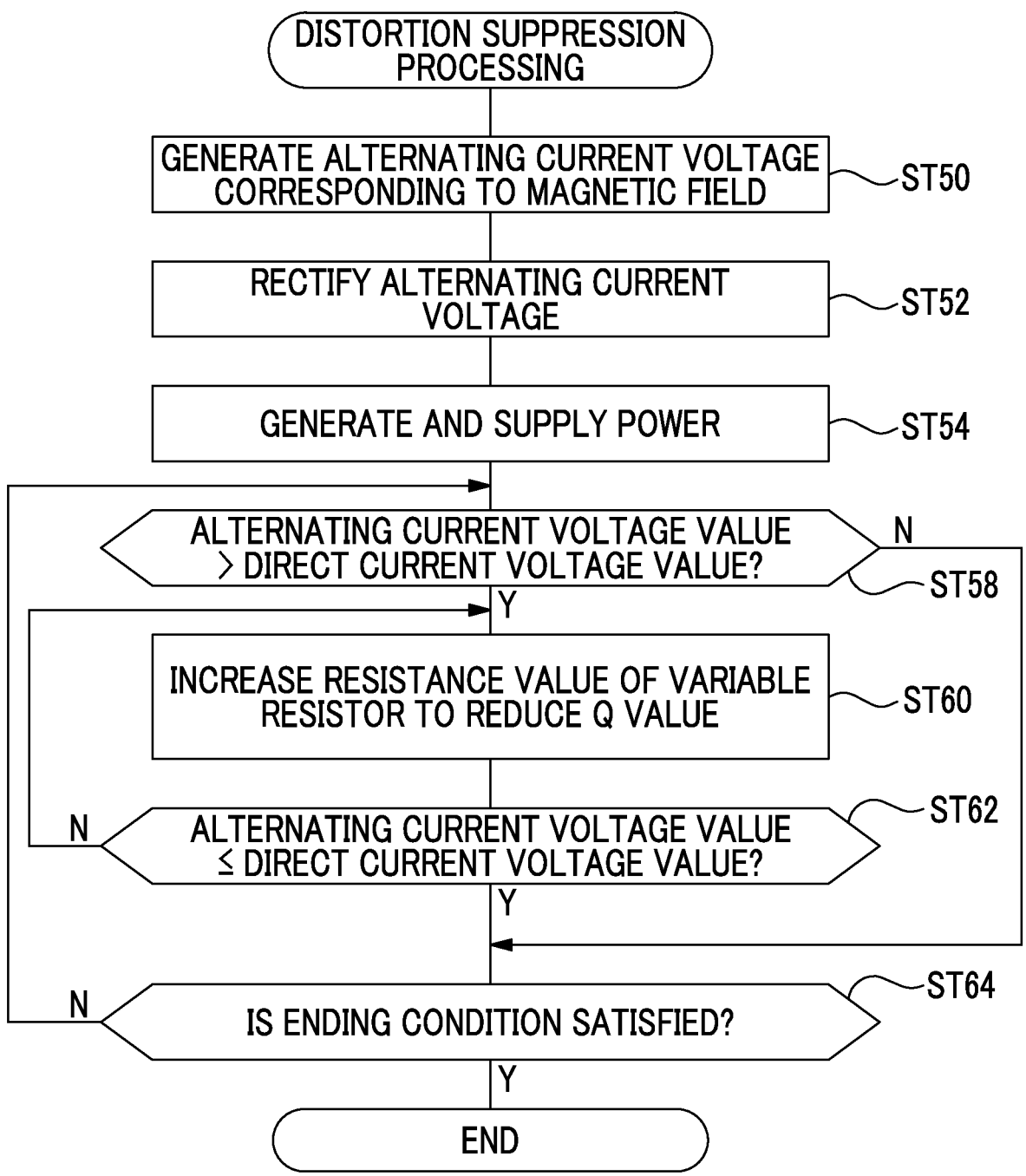
FIG. 10 is a flowchart showing an example of a flow of distortion suppression processing.

In the distortion suppression processing shown in FIG. 10, in step ST50 to step ST54, the same processing as step ST10 to step ST14 described above is performed.

In step ST58, the monitoring circuit 70 determines whether or not the voltage value of the alternating current voltage 56 is larger than the voltage value of the direct current voltage 58. In step ST58, in a case where the voltage value of the alternating current voltage 56 is larger than the voltage value of the direct current voltage 58, determination is made to be affirmative, and the distortion suppression processing shifts to step ST60. In step ST58, in a case where the voltage value of the alternating current voltage 56 is equal to or less than the voltage value of the direct current voltage 58, determination is made to be negative, and the distortion suppression processing shifts to step ST64.

In step ST60, the control circuit 72 increases the resistance value of the variable resistor 50A3 to reduce the Q value. After the processing of step ST60 is executed, the distortion suppression processing shifts to step ST62.

In step ST62, the monitoring circuit 70 determines whether or not the voltage value of the alternating current voltage 56 is equal to or less than the voltage value of the direct current voltage 58. In step ST62, in a case where the voltage value of the alternating current voltage 56 is equal to or less than the voltage value of the direct current voltage 58, determination is made to be affirmative, and the distortion suppression processing shifts to step ST64. In step ST62, in a case where the voltage value of the alternating current voltage 56 is larger than the voltage value of the direct current voltage 58, determination is made to be negative, and the distortion suppression processing shifts to step ST60.

In step ST64, the monitoring circuit 70 determines whether or not a condition under which the distortion suppression processing ends is satisfied. An example of the condition under which the distortion suppression processing ends is a condition that a time during which the voltage value of the alternating current voltage 56 or the voltage value of the direct current voltage 58 is "zero" continues for a certain period of time or longer, or a condition that a command for causing the distortion suppression processing to end is given from the reader/writer 46 as the command signal 48.

In step ST64, in a case where the condition under which the distortion suppression processing ends is not satisfied, determination is made to be negative, and the distortion suppression processing shifts to step ST58. In step ST64, in a case where the condition under which the distortion suppression processing ends is satisfied, determination is made to be affirmative, and the distortion suppression processing ends.

As described above, in the present embodiment, the resonance circuit 50A is caused to resonate at the predetermined resonance frequency by adjusting the capacitance of the variable condenser 50A2 by the control circuit 72. The predetermined resonance frequency refers to, for example, the resonance frequency at which the direct current voltage 58 is maximized. In a case where the direct current voltage 58 is maximized, it is possible to realize stabilization of the supply of the power 60 to the various circuits of the cartridge memory 24. Further, in the present embodiment, the Q value is adjusted by adjusting the resistance value of the variable resistor 50A3 by the control circuit 72. By adjusting the Q value, the distortion of the waveform of the alternating current voltage 56 is less likely to occur. Therefore, according to the present embodiment, it is possible to achieve both stabilization of the power 60 for operating the cartridge memory 24 and suppression of the distortion of the waveform of the alternating current voltage 56.

In addition, in the present embodiment, the resonance circuit 50A is caused to resonate at the predetermined resonance frequency by adjusting the capacitance of the variable condenser 50A2 in accordance with a result obtained by comparing the voltage value of the alternating current voltage 56 and the voltage value of the direct current voltage 58 (for example, the comparison result 74). Further, in the present embodiment, the Q value is adjusted by adjusting the resistance value of the variable resistor 50A3 in accordance with the result obtained by comparing the voltage value of the alternating current voltage 56 and the voltage value of the direct current voltage 58. Therefore, according to the present embodiment, it is possible to accurately achieve both the stabilization of the power 60 for operating the cartridge memory 24 and the suppression of the distortion of the waveform of the alternating current voltage 56.

Further, in the present embodiment, in a case where the voltage value of the alternating current voltage 56 is larger than the voltage value of the direct current voltage 58, the control circuit 72 increases the resistance value of the variable resistor 50A3 to reduce the Q value. As a result, it is possible to easily suppress the distortion of the waveform of the alternating current voltage 56.

Further, in the present embodiment, in a case where the voltage value of the alternating current voltage 56 is larger than the voltage value of the direct current voltage 58, the control circuit 72 adjusts the capacitance of the variable condenser 50A2 to maximize the direct current voltage 58. As a result, it is possible to realize the stabilization of the power 60 for operating the cartridge memory 24. Further, the direct current voltage 58 is generated by the rectifier circuit 50B, and the power 60 is generated based on the direct current voltage 58 by the regulator 50C and is supplied to the processor 54A. Therefore, operation of the processor 54A can be stabilized.

In addition, in the present embodiment, the communication signal 62 corresponding to the signal 68 includes a signal obtained by decoding the command signal 48, and the processor 54A executes processing in response to the command signal 48. In the present embodiment, in a case where the voltage value of the alternating current voltage 56 is larger than the voltage value of the direct current voltage 58, since the distortion of the waveform of the signal 68 is suppressed by increasing the resistance value of the variable resistor 50A3, the processor 54A can improve reliability of execution of the processing in response to the command signal 48. For example, it is possible to improve reliability of the processing of writing the information determined in response to the command signal 48 (for example, the management information 15) into the NVM 54B and/or the processing of reading out the information determined in response to the command signal 48 (for example, the management information 15) from the NVM 54B.

In the above-described embodiment, although an aspect example in which the power maximization processing and the distortion suppression processing are executed in parallel has been described, for example, in a case where a battery capable of accumulating the power 60 is mounted on the cartridge memory 24 and the power 60 is sufficiently secured in the battery, the power 60 accumulated in the battery may be used as the power for operating the cartridge memory 24, meanwhile the distortion suppression processing may be executed without executing the power maximization processing. Moreover, in a case where the power 60 is in short in the battery, the power maximization processing and the distortion suppression processing may be executed in parallel.

Figure 11:
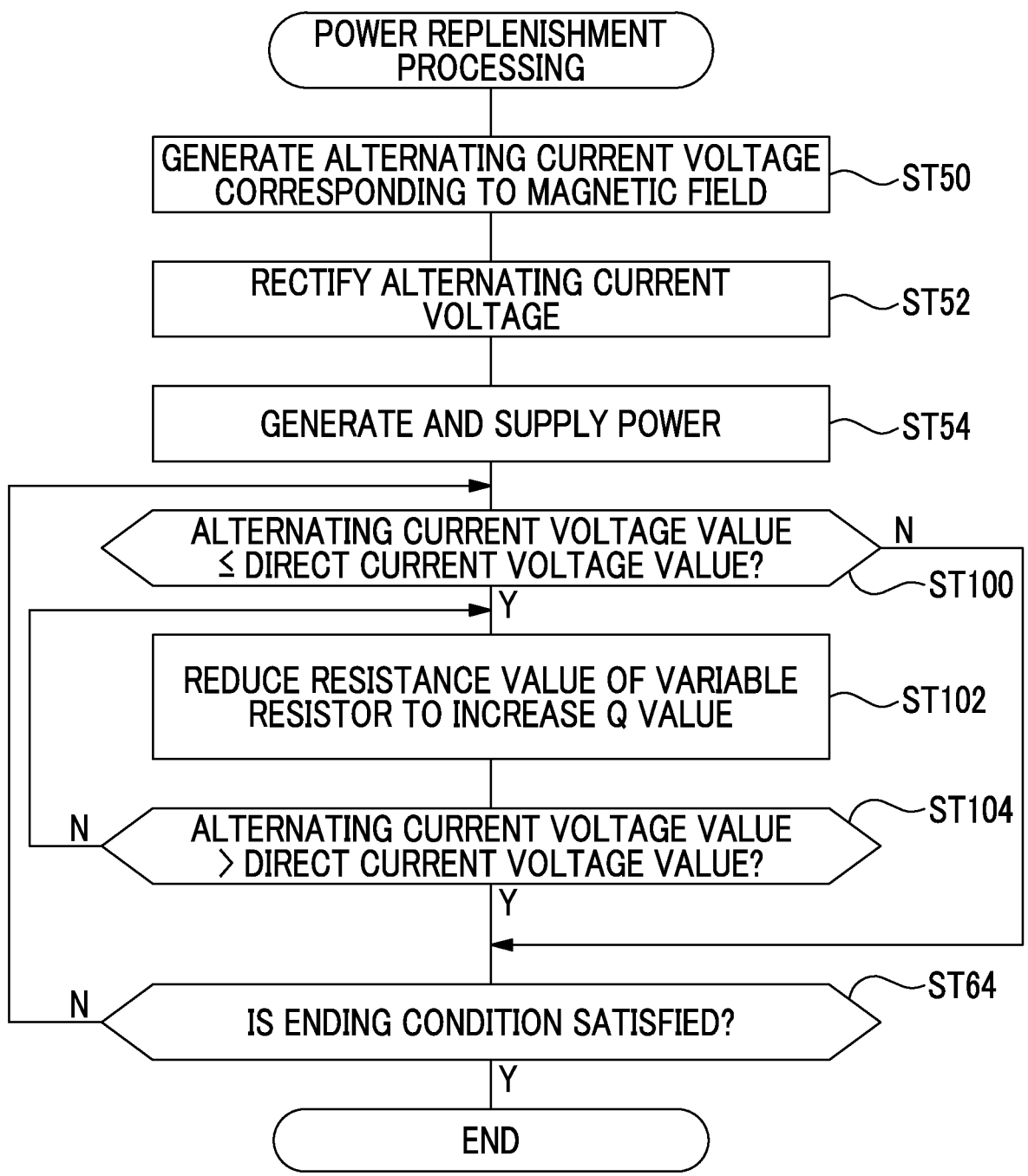
FIG. 11 is a flowchart showing an example of a flow of power replenishment processing.

Further, in a case where the power 60 is in short in the battery (that is, in a case where the power for operating the cartridge memory 24 is in short) and/or in a case where the distortion of the waveform of the signal 68 is allowable to a certain extent, power replenishment processing shown in FIG. 11 as an example may be executed only for a certain period of time (for example, a time required for the sufficient power 60 to be accumulated in the battery) without executing the distortion suppression processing. In the power replenishment processing shown in FIG. 11, as compared with the distortion suppression processing shown in FIG. 10, a point that processing of step ST100 is executed instead of the processing of step ST58, a point that processing of step ST102 is executed instead of the processing of step ST60, and a point that processing of step ST104 is executed instead of the processing of step ST62 are different.

In step ST100 shown in FIG. 11, the monitoring circuit 70 determines whether or not the voltage value of the alternating current voltage 56 is equal to or less than the voltage value of the direct current voltage 58. In step ST100, in a case where the voltage value of the alternating current voltage 56 is larger than the voltage value of the direct current voltage 58, determination is made to be negative, and the power replenishment processing shifts to step ST64. In step ST100, in a case where the voltage value of the alternating current voltage 56 is equal to or less than the voltage value of the direct current voltage 58, determination is made to be affirmative, and the power replenishment processing shifts to step ST102.

In step ST102, the control circuit 72 reduces the resistance value of the variable resistor 50A3 to increase the Q value.

In step ST104, the monitoring circuit 70 determines whether or not the voltage value of the alternating current voltage 56 is larger than the voltage value of the direct current voltage 58. In step ST104, in a case where the voltage value of the alternating current voltage 56 is equal to or less than the voltage value of the direct current voltage 58, determination is made to be negative, and the power replenishment processing shifts to step ST102. In step ST104, in a case where the voltage value of the alternating current voltage 56 is larger than the voltage value of the direct current voltage 58, determination is made to be affirmative, and the power replenishment processing shifts to step ST64.

In this way, in a case where the voltage value of the alternating current voltage 56 is equal to or less than the voltage value of the direct current voltage 58, since the Q value increases by decreasing the resistance value of the variable resistor 50A3, intensity of the magnetic field MF received by the antenna coil 50A1 can be increased (that is, the supply of the magnetic field MF can be increased). In a case where the intensity of the magnetic field MF received by the antenna coil 50A1 can be increased, the voltage value of the direct current voltage 58 can also be increased by the rectifier circuit 50B, and as a result, the power 60 that is generated by the regulator 50C and supplied to the various circuits can also be increased.

In the above-described embodiment, although the cartridge memory 24 that performs communication with the reader/writer 46 in a noncontact manner has been described as an example, the technology of the present disclosure is not limited thereto, and is also applicable to a noncontact communication medium other than the cartridge memory 24 (for example, a passive type RFID tag used in a technical field different from the present technical field).

In the above-described embodiment, the reader/writer 46 mounted on the magnetic tape drive 14 has been exemplified, but the technology of the present disclosure is not limited thereto, and a reader/writer other than the reader/writer 46 (for example, a reader/writer used in a technical field different from the present technical field) may be used. In addition, an external device that performs write-in or readout by communicating in a noncontact manner with a noncontact communication medium to which the technology of the present disclosure is applied may be used.

In the above-described embodiment, although a stationary type reader/writer (that is, a reader/writer that is mounted on the magnetic tape drive 14) has been exemplified as the reader/writer 46, this is merely an example, and the technology of the present disclosure is valid even in a case of a portable type reader/writer. In addition, the stationary or portable reader/writer may be a reader/writer used in a technical field different from the present technical field.

In the above-described embodiment, although the magnetic tape system 10 in which the magnetic tape cartridge 12 can be inserted into and removed from the magnetic tape drive 14 has been described, but the technology of the present disclosure is not limited thereto. For example, even in a case of a magnetic tape system in which at least one magnetic tape cartridge 12 is loaded in advance into the magnetic tape drive 14 (that is, a magnetic tape system in which at least one magnetic tape cartridge 12 and the magnetic tape drive 14, or the magnetic tape MT and the magnetic tape drive 14 are integrated in advance (for example, before data is recorded in a data band)), the technology of the present disclosure is valid.

Contents described and shown above are for detailed description of a part according to the technology of the present disclosure and are merely an example of the technology of the present disclosure. For example, description of the above-described configurations, functions, actions, and effects is description of an example of configurations, functions, actions, and effects of a part according to the technology of the present disclosure. Thus, it is needless to say that unnecessary parts may be deleted, new elements may be added, or replacement may be made to the content of the above description and the content of the drawings without departing from the gist of the technology of the present disclosure. Furthermore, to avoid confusion and to facilitate understanding of a part according to the technology of the present disclosure, description relating to common technical knowledge and the like that does not require particular description to enable implementation of the technology of the present disclosure is omitted from the content of the above description and from the content of the drawings.

In the present specification, "A and/or B" has the same meaning as "at least one of A or B". That is, "A and/or B" may refer to A alone, B alone, or a combination of A and B. Furthermore, in the present specification, a similar concept to "A and/or B" applies to a case where three or more matters are expressed by linking the matters with "and/or".

All cited documents, patent applications, and technical standards described in the present specification are incorporated by reference in the present specification to the same extent as in a case where each individual cited document, patent application, or technical standard is specifically and individually indicated to be incorporated by reference.

What is claimed is:

1. A noncontact communication medium that performs communication, via a magnetic field provided from an external device, with the external device in a noncontact manner, the noncontact communication medium comprising:
    a resonance circuit configured to resonate using an induced current induced, with application of the magnetic field to an antenna coil, by the antenna coil to generate an alternating current voltage; and
    a control circuit,
    wherein the resonance circuit includes
    a variable condenser connected in parallel to the antenna coil, and
    a variable resistor connected in parallel to the antenna coil,
    the control circuit is configured to adjust capacitance of the variable condenser to cause the resonance circuit to resonate at a predetermined resonance frequency, and to adjust a resistance value of the variable resistor to adjust a Q value,
    the noncontact communication medium is configured to operate using power based on a direct current voltage obtained by rectifying the alternating current voltage, and
    the communication is communication using a signal corresponding to a waveform of the alternating current voltage.

2. The noncontact communication medium according to claim 1,
    wherein the control circuit is configured to adjust the capacitance in accordance with a comparison result between a voltage value of the alternating current voltage and a voltage value of the direct current voltage to cause the resonance circuit to resonate at the predetermined resonance frequency, and to adjust the resistance value in accordance with the comparison result to adjust the Q value.

3. The noncontact communication medium according to claim 1,
    wherein, in a case where a voltage value of the alternating current voltage is larger than a voltage value of the direct current voltage, the control circuit is configured to increase the resistance value to reduce the Q value.

4. The noncontact communication medium according to claim 1,
    wherein, in a case where a voltage value of the alternating current voltage is larger than a voltage value of the direct current voltage, the control circuit is configured to adjust the capacitance to maximize the direct current voltage.

5. The noncontact communication medium according to claim 1, further comprising:
    a rectifier circuit configured to rectify the alternating current voltage to generate the direct current voltage;
    a regulator configured to generate the power based on the direct current voltage; and
    a processing circuit configured to operate by supply of the power.

6. The noncontact communication medium according to claim 1, further comprising a processing circuit configured to operate by supply of the power,
    wherein the signal includes a command signal transmitted from the external device, and
    the processing circuit is configured to execute processing in response to the command signal.

7. The noncontact communication medium according to claim 6, further comprising a memory,
    wherein the processing includes write-in processing of writing first information determined in response to the command signal into the memory, and/or
    read-out processing of reading out second information determined in response to the command signal from the memory.

8. The noncontact communication medium according to claim 1,
    wherein the predetermined resonance frequency is a resonance frequency at which the direct current voltage is maximized.

9. The noncontact communication medium according to claim 1,
    wherein the noncontact communication medium is mounted on a magnetic tape cartridge.

10. A magnetic tape cartridge comprising:
    the noncontact communication medium according to claim 1; and
    a magnetic tape,
    wherein the noncontact communication medium includes a memory, and
    the memory stores information on the magnetic tape.

11. A magnetic tape drive comprising:
    a magnetic tape cartridge including the noncontact communication medium according to claim 1, and a magnetic tape; and
    a magnetic head into which the magnetic tape cartridge is loaded and that performs recording processing and/or playing processing with respect to the magnetic tape.

12. A noncontact communication system comprising:
    the noncontact communication medium according to claim 1; and
    a communication device configured to perform communication with the noncontact communication medium in a noncontact manner.

* * * * *